(12) United States Patent
Terävaet al.

(10) Patent No.: US 6,485,649 B1
(45) Date of Patent: Nov. 26, 2002

(54) METHOD AND DEVICE FOR THE PRODUCTION OF PURE WATER

(75) Inventors: Jorma Terävä, Lempäälä (FI); Teppo Nurminen, Vantaa (FI)

(73) Assignee: Steris Europe, Inc., Camberly (GB)

( * ) Notice: Subject to any disclaimer, the term of this patent is extended or adjusted under 35 U.S.C. 154(b) by 0 days.

(21) Appl. No.: 09/554,293

(22) PCT Filed: Nov. 11, 1998

(86) PCT No.: PCT/FI98/00876

§ 371 (c)(1),
(2), (4) Date: May 9, 2000

(87) PCT Pub. No.: WO99/24363

PCT Pub. Date: May 20, 1999

(30) Foreign Application Priority Data

Nov. 12, 1997 (FI) .................................................. 974211

(51) Int. Cl.[7] .......................... B01D 37/04; B01D 29/66; C02F 1/02

(52) U.S. Cl. ...................... 210/636; 210/650; 210/651; 210/741; 210/774; 210/791; 210/108; 210/181; 210/321.69; 210/416.1; 210/900; 422/14; 422/42; 422/112; 422/255; 422/260

(58) Field of Search .............................. 210/636, 650, 210/651, 652, 653, 900, 774, 181, 741, 791, 97, 106, 108, 416.1; 422/14, 41–42, 112, 321.69, 255, 260

(56) References Cited

U.S. PATENT DOCUMENTS

| | | | |
|---|---|---|---|
| 4,610,790 A | * 9/1986 | Reti et al. | 210/636 |
| 4,664,793 A | * 5/1987 | Murakami et al. | 210/181 |
| 4,879,041 A | * 11/1989 | Kurokawa et al. | 210/900 |
| 5,032,265 A | * 7/1991 | Jha et al. | 210/195.2 |
| 5,124,033 A | * 6/1992 | Ohmi et al. | 210/181 |
| 5,139,676 A | * 8/1992 | Ebisawa et al. | 210/181 |
| 5,468,350 A | * 11/1995 | Ban | 210/748 |
| 6,024,880 A | * 2/2000 | Ciora, Jr. et al. | 210/651 |
| 6,126,834 A | * 10/2000 | Tonelli et al. | 210/900 |

FOREIGN PATENT DOCUMENTS

| | | |
|---|---|---|
| DE | 3618186 A1 | 1/1987 |
| EP | 0536963 A1 | 4/1993 |
| GB | 1457648 B | 12/1976 |
| WO | WO 98/28060 | 7/1998 |

OTHER PUBLICATIONS

Osmonics, "Pure Water Handbook", 2nd Ed., 1997, 1991.
Cheryan, "Ultrafiltration and Microfiltration Handbook", 1998.
The United States Pharmacopeia—The National Formulary US Pharmacopeial Convention, Washington DC, Official Jan. 1, 1995.

* cited by examiner

Primary Examiner—Robert J. Popovics
(74) Attorney, Agent, or Firm—Fay, Sharpe, Fagan, Minnich & McKee, LLP

(57) ABSTRACT

Input water is preheated in a heat exchanger (2), pumped (4) through another heat exchanger (5) into a heating unit (6). The heating unit heats the water to a temperature of above 100° C., preferably 140–150° C., while maintaining the water in a liquid state without vaporization. A pump (8) feeds the heated water under sufficient pressure to prevent vaporization to at least one crossflow filtration unit (9). A portion of the heated water passes through a thermally stable filtration material having a pore size of 1–20 nanometers for filtering endotoxins and pyrogens, 4–10 nanometers for filtering viruses, or 100 nanometers–30 μm for filtering bacteria. Heated water which has passed through the filtration material is fed through a pure water product outlet of the filtration unit to a pure water outlet (16). A retenate portion of the heated water flows past the filtration material to carry filtered impurities through a retenate output line (10). To conserve energy, the retenate output line passes through the heat exchanger (2) and the pure water product line passes through the heat exchanger (5) to preheat the incoming water. A backflushing valve (7) selectively passes pure water product backward through the filtration material to backflush impurities trapped in the filtration material.

29 Claims, 1 Drawing Sheet

METHOD AND DEVICE FOR THE PRODUCTION OF PURE WATER

FIELD OF THE INVENTION

The invention relates to the field of pure water production. In particular, the invention relates to the production of water for injection avoiding the use of distillation.

BACKGROUND OF THE INVENTION

Particularly pure water is required for certain industrial uses in, for example, the pharmaceutical and electronics industries. In this context, by pure water is meant water purified for extraordinary uses, which is essentially sterile and from which inorganic and organic impurities have been removed to such an extent that preset quality requirements are fulfilled.

The quality requirements set for water are directed to its chemical and microbiological properties. The chemical quality can be properly monitored by conductivity measurement. From a microbiological point of view, the properties to be monitored are sterility and pyrogenicity. Bacteria, for example, shred cell membrane fragments into their environment. These fragments are essentially lipopolysaccharides, acting as pyrogens, i.e. fever-raising agents. These are relatively thermostable compounds, and may require high temperatures and prolonged heating periods for disintegration or loss of adverse properties. Pyrogens are removed from water in high quality distillation, and may also be removed by reverse osmosis due to the very narrow pores in the membranes used therein.

In the pharmaceutical field, the greatest purity requirements are applied to water used for injectable preparations, the so-called water for injection (WFI) grade. When water for injection is produced, the aforementioned biogenic units, which are smaller than microbes, must be removed. Methods approved for the production of WFI grade water are defined in pharmacopoeias. The 23 US Pharmacopoeia, issued in 1996, stipulates that water for injection may be produced by means of distillation or reverse osmosis. The corresponding European Pharmacopoeia allows only distillation. High grade distillation processes require substantial investments and production costs are high. Reverse osmosis is a more economical method, but often causes higher maintenance costs.

By ultrafiltration, it is possible to remove even large molecules, as pyrogens, from water. The membranes used are, however, usually sensitive to heat and harsh chemical conditions. Microbes and pyrogens must first be removed from the apparatus itself before the filtration process commences, and in addition the feed side must be cleaned, sterilized and freed of pyrogens at regular intervals during production. Most ultrafiltration equipment is badly suited for this type of use.

U.S. Pat. No. 5,104,546 discloses a method for the production of pyrogen-free water using a crossflow ultrafiltration element comprising a zirconium oxide membrane on a ceramic support. The material may be freed of pyrogens chemically, for example with nitric acid. The thermal stability of the ceramic filtration elements is also significant, and they may be repeatedly steam sterilized.

International Patent Application WO98/28060 discloses a method for manufacturing a flat, porous ceramic filter cassette, suitable for both dead-end and crossflow filtration. With proper choice of materials, the resulting filter element will have the physical and chemical resistance properties required for operation under sterilizing conditions.

U.S. Pat. No. 4,664,793 discloses a device for the production of pure water, wherein the purified water is circulated in a main circuit including a storage vessel. The water in said circuit is heat treated (60–90° C.) in a batchwise manner when the bacterial concentration in the circuit has reached a preset threshold value. The circuit includes a dead-end filtration unit and a heat exchanger for cooling the purified water to its working temperature with external cooling water. By these means it is not, however, possible to produce, for example, water for injection, as the indicated temperature would call for a long residence time in order to reach the required sterility level.

SUMMARY OF THE INVENTION

A method according to claim 1 for the production of pure water has now been invented, comprising no periodical sterilization cycles as the continuous process comprises an integrated stage for heat sterilization of liquid water before the filtration step, and in addition the filtration itself is carried out under heat sterilizing conditions. Preferably, the pure water produced may be WFI grade.

Another objective of the invention is to provide a device according to claim 4 for the production of purified water, which device comprises as its essential components a continuously operating hot sterilization section and a filtration section wherein the filtration capacity, when required, is sufficient for producing pyrogen-free water.

Advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DESCRIPTION OF A PREFERRED EMBODIMENT

Figure 1:
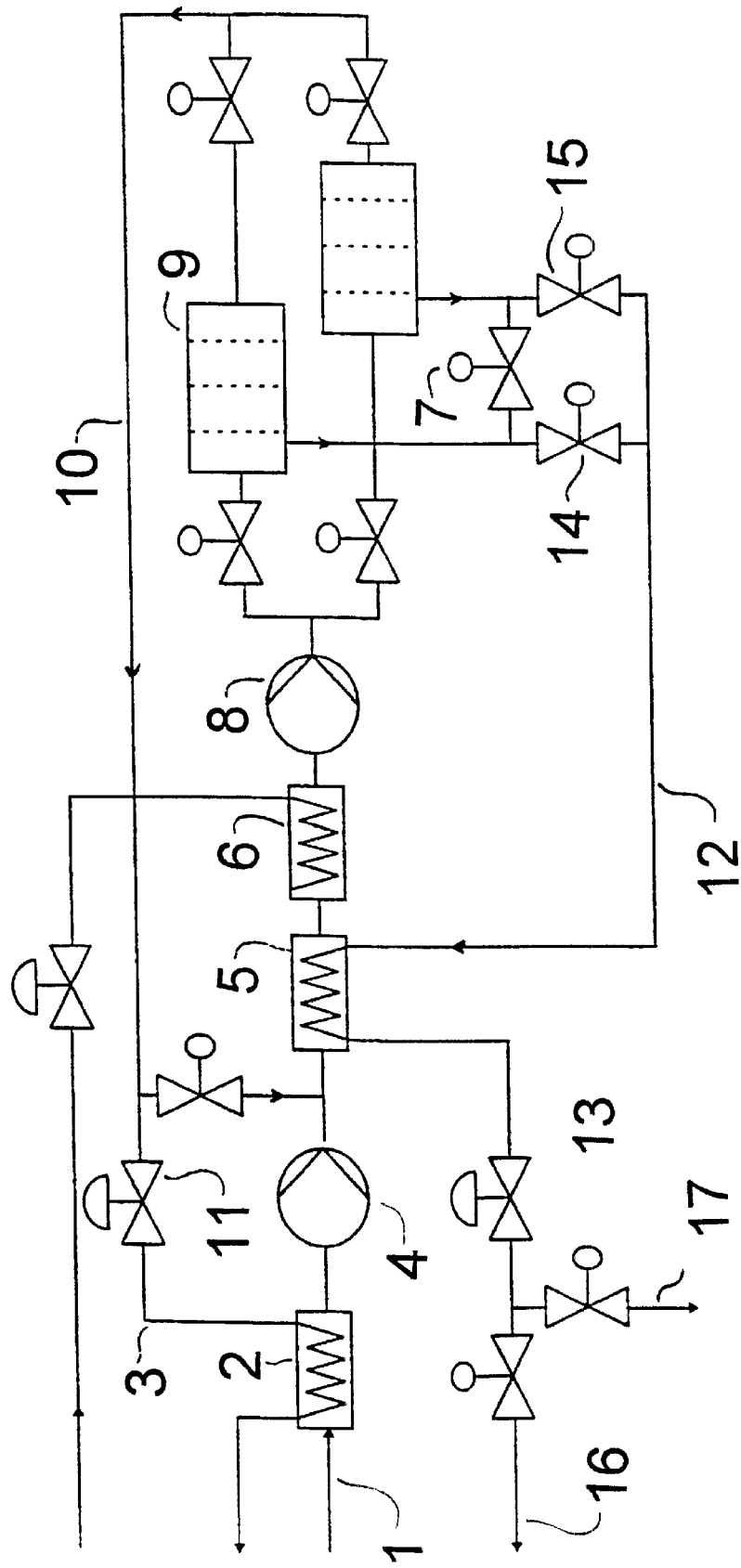
FIG. 1 is a diagram of a pure water generator in accordance with the present invention.

The features of the invention are set forth below, with reference to the attached drawing which shows the layout of a device for carrying out a process according to the invention. Feed water enters through pipe (1) and first passes heat exchanger (2), where it is preheated with the heat of reject stream (3). Next, the pressure is raised with pump (4), preferably to about 15 bar. A second preheating takes place in exchanger (5), in the other side of which the product, e.g. water for injection, flows. The final temperature raise to the sterilization temperature takes place in heater (6) which may be for example a steam-heated heat exchanger as shown in the figure, or an electrical heater. By means of filtration circuit circulation pump (8), the water is fed through a crossflow-type filter unit (9), whereby part of the water, the permeate, penetrates the pores and is purified, while the remaining part, the retentate, is recycled to the filtration circuit. This type of filter unit is widely used for demanding separations, as disclosed in e.g., Cheryan M., "Ultrafiltration and Microfiltration Handbook", Technomic Publishing Co., Inc., Lancaster, Pa., 6–7.

The material of the filtration element shall be sufficiently inert and thermostable; preferably the filtration element or -elements is of a ceramic material, for example of the type disclosed in International Patent Application WO98/28060, cited above and having a large surface-to-volume ratio and a functional filter membrane on a monolithic ceramic support. Ceramic materials include, for example, materials based on aluminium, titanium and zirconium oxides, carbides or nitrides. Other possible filter materials include metals, for example sintered acid resistant steel. Specialty polymers, including PTFE (polytetrafluoroethylene), FEP (fluorinated ethylene propylene) PEEK (polyether ether ketone), PES (polyether sulfone), having the required heat-resistant properties and chemical stablity may be used. The separation capacity of the filtration element shall correspond to the purity requirements of the water product, and if necessary it shall be sufficient for the separation of pyrogens. For separation of endotoxins or pyrogens, a pore size in the range 1 nm to 20 nm is typically used; for viruses, a corresponding typical pore size is in the range 4 nm to 100 nm; and for bacteria, a typical pore size range is 100 nm to 30 $\mu$m.

Preferably, several filtration units (two shown in the figure) are coupled in parallel, whereby backwashing and maintenance may be carried out during operation as disclosed below. The return flow (10) from the filtration circuit is split between the filtration circuit and the reject stream (3) by means of a control valve (11). It is characteristic for a process according to the invention, that the filtration circuit (5, 6, 8, 9, 10), together with the filtration unit, forms a high temperature zone which continuously stays sterile during production of purified water.

The pure water, the pressure of which has fallen according to the pressure loss of the filtration unit, is led through pipe (12) to heat exchanger (5), where the temperature of said water usually is lowered to below boiling temperature, as the heat is carried to the beginning of the filtration circuit. Preferably, heat exchanger (5) is a shell-and-tube exchanger wherein the ends of the tubes are joined to double end jacket plates to prevent the contamination of purified product water by water from the filtration circuit, should leakage occur at the joint between tube and end plate; instead, filtration circuit water would leak to the outside. Through control valve (13), the purified water is carried to its point of consumption in tube (16). Reject water can be diverted through branch (17) during plant startup.

Preferably, the filtration units are provided with means for pressure measurement on both feed side and product side, and with means for comparison of these measurements. As the pressure drop over a filtration unit reaches a threshold value during operation as deposits are built up, backwashing can be carried out with pure water by means of parallel filtration units, whereby one or both of product valves (14, 15) is closed, and valve (7) is opened.

The material of the device shall fulfill the technical and regulatory requirements, generally acid resistant steel and PTFE are the materials of choice in addition to the material of the filter units. The temperature of the water circulating in the filtration circuit is constantly above its atmospheric-pressure boiling point, and as the circuit pressure may be in the order of 15 bar as set forth above or even higher, the apparatus must be designed to operate under elevated pressure at the relevant temperature; consequently, the pumps, tubing and valves must be chosen accordingly and the vessels designed according to the relevant pressure vessel codes and regulations.

As a permanent high temperature zone is included in a continuous process, the separate sterilizing stages usually carried out at regular intervals in purified water production devices, have been eliminated. The minimum water dwell time in the sterilization zone is adjusted to the temperature used in order to provide continuous sterility on the pressure side of the filtration elements. The temperature of the sterilization section is above 100° C.; preferably it is above 140° C.; and most preferably it is in the range 140–150° C. Because water is not evaporated at any point, and a substantial part of the energy in the streams leaving the process is transferred to the feed stream, energy economy is good. The amount of energy required for evaporating the water would be about three times that required for heating the water to 140–150° C. under pressure.

The disclosed device is designed for production of purified water, but it is obvious to a person skilled in the art, that other aqueous liquids may be sterilized and purified taking into account their physical and chemical properties.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A continuous method for producing pure water by means of heat sterilization and filtration comprising:

heating water without evaporation to a temperature above 100° C. for a time sufficient (i) for achieving a predetermined sterility level in said water, and (ii) for keeping the apparatus confining the water during said sterilization step sterile during production;

crossflow filtering the heated water under heat sterilizing conditions at essentially the temperature of the sterilization step.

2. The method according to claim 1 wherein the pure water from the crossflow filtering step is "water for injection" quality.

3. The method according to claim 1 wherein the temperature of sterilization is between 140–150° C.

4. A continuous method for producing pure water by means of heat sterilization and filtration comprising:

heating feed water without vaporization to a temperature above 140° C. for a time sufficient to achieve a preselected sterility level in said water;

crossflow filtering the heated water at essentially the sterilization temperature.

5. The method according to claim 4 wherein the crossflow filtering step divides the heated water into a permeate water and retentate water and further including:

preheating the feed water prior to the heating step with heat from at least one of the permeate water and the retentate water.

6. The method according to claim 5 wherein tie feed water is kept above 100° C. during the crossflow filtering step.

7. A device for producing pure water, the device comprising:

at least one filtration unit having sufficient separation power for rendering said water sufficiently pure to satisfy preselected purity standards;

a filtration circuit including said filtration unit, which circuit is adapted for holding a temperature above 100° C. and for circulating said water at a temperature above 100° C.;

a means for heating water and keeping said heated water in liquid form above 100° C. without vaporization for a period sufficient for sterilization and for maintaining the water in the filtration unit and the filtration circuit above 100° C. during filtering.

8. The device according to claim 7 wherein the separation capacity of said at least one filtration unit is sufficient for producing water for injection.

9. The device according to claim 7 further including a means for transferring heat from water streams leaving the device to feed water.

10. The device according to claim 9 wherein the heat transferring means includes a tube and shell heat exchanger having double end jacket walls.

11. The device according to claim 7 further including a means for measuring a pressure difference between feed and product sides of the filtration units.

12. A method for producing pure water comprising:
heating water under pressure to a temperature above 100° C. without vaporization;
passing a first portion of the heated water at a temperature above 100° C. through a filter to generate a pure water product stream;
passing another portion of the heated water past the filter at a temperature above 100° C. in a retentate flow.

13. The method according to claim 12 wherein in the heating step, the water is heated above 140° C.

14. The method according to claim 12 wherein heat from the retentate flow is transferred to the water prior to the heating step to preheat the water.

15. The method according to claim 12 further including:
in the filtering step, blocking impurities with a dimension greater than 20 nanometers from passing through the filter to the pure water product flow and retaining the blocked impurities in the retentate flow.

16. The method according to claim 12 further including:
forcing a flow of the pure water product flow back through the filter to backflush impurities trapped in the filter into the retentate flow.

17. The method according to claim 12 wherein, in the passing steps, the heated water is maintained above 100° C.

18. The method according to claim 12 further including:
monitoring pressure across the filter;
in response to the monitored pressure reaching a preselected set point pressure, backflushing the filter.

19. A pure water generator comprising:
a crossflow filtration unit having:
a heated water input through which heated water is received,
a pure water product outlet through which heated water that has passed through a thermally stable filter material is discharged, and
a retentate output through which heated water and impurities which are too large to pass through the filter material are discharged;
a heater connected with the heated water input which heats input water to a temperature sufficiently above 100° C. to maintain the water in the crossflow filtration unit above 100° C. during filtering from the heated water input to the pure water product outlet.

20. The pure water generator according to claim 19 wherein the filter material has a pore size in the range of 1–20 nanometers for filtering endotoxins and pyrogens.

21. The pure water generator according to claim 19 wherein the filter material has a pore size in the range of 4–10 nanometers for filtering viruses.

22. The pure water generator according to claim 19 wherein the filter material has a pore size in the range of 100 nanometers to 30 μm for filtering bacteria.

23. The pure water generator according to claim 19 further including a second crossflow filtration unit having:
a heated water input through which heated water from the heater is received,
a pure water product outlet through which heated water that has passed through a thermally stable filter material is discharged, and
a retentate output through which heated water and impurities which are too large to pass through the filter material are discharged.

24. The pure water generator according to claim 23 further including:
a valve connected between the pure water product outputs of the first and second filtration units for selectively feeding back pure water product to each of the filtration units to backflush impurities trapped in the filter material into the retentate flow.

25. The pure water generator according to claim 19 further including:
a pump disposed between the heater output and the filtration unit input to raise a pressure of the heated water.

26. The pure water generator according to claim 19 further including:
a heat exchanger connected with the input water line and connected with one of the pure water product outlet and the retentate output for transferring heat from the pure water product or the retentate to the input water.

27. The pure water generator according to claim 26 further including:
a second pump for pumping input water to the heat exchanger; and
a second heat exchanger disposed upstream from the second pump for preheating water pumped by the second pump, the second heat exchanger being connected with the other of the retentate output and the pure water product outlet.

28. A continuous method for producing pure water comprising:
heating water without evaporation to a temperature above 100° C. for a time sufficient to sterilize said water;
crossflow filtering the heated sterile water to generate a retentate water flow and a pure water flow, keeping the sterile water heated to above 100° C. during the crossflow filtering.

29. A device for producing pure water, the device comprising:
a crossflow filter having a sterile water input, a permeate output, and a retentate output;
a heater means connected with the sterile water input for heating the sterile water without evaporation above 100° C. and keeping the water in the crossflow filter above 100° C. during filtering.

* * * * *